United States Patent [19]
Kasuga

[11] Patent Number: 5,454,278
[45] Date of Patent: Oct. 3, 1995

[54] BALL SCREW INTEGRATED LINEAR GUIDE UNIT

[75] Inventor: Shinichi Kasuga, Gunma, Japan

[73] Assignee: NSK Ltd., Tokyo, Japan

[21] Appl. No.: 156,912

[22] Filed: Nov. 24, 1993

[30] Foreign Application Priority Data

Nov. 25, 1992 [JP] Japan .................. 4-081150 U

[51] Int. Cl.[6] ........................................... F16H 25/22
[52] U.S. Cl. .................. 74/459; 74/424.8 R; 184/5; 384/13
[58] Field of Search ............... 74/459, 424.8 R, 74/89.15; 384/13, 45; 184/5, 100, 6.12, 9, 37, 7.1

[56] References Cited

U.S. PATENT DOCUMENTS

| | | | |
|---|---|---|---|
| 4,479,681 | 10/1984 | Suzuki | 308/5 R X |
| 4,850,720 | 7/1989 | Osawa | 384/13 X |
| 4,932,279 | 6/1990 | Kasuga | 74/424.8 R |
| 4,953,418 | 9/1990 | Hirose | 74/424.8 A X |
| 5,074,160 | 12/1991 | Kasuga | 74/89.15 X |
| 5,279,175 | 1/1994 | Kasuga et al. | 74/459 |
| 5,311,788 | 5/1994 | Kasuga | 74/89.15 X |
| 5,380,096 | 1/1995 | Tanaka | 384/13 |

FOREIGN PATENT DOCUMENTS

| | | |
|---|---|---|
| 3931806 | 9/1989 | Germany . |
| 62-200016 | 9/1987 | Japan . |
| 63-29940 | 8/1988 | Japan . |

*Primary Examiner*—Rodney H. Bonck
*Assistant Examiner*—Troy Grabow
*Attorney, Agent, or Firm*—Sughrue, Mion, Zinn, Macpeak & Seas

[57] ABSTRACT

A ball screw integrated linear guide unit arranging on an inner end surface of an end cap not only linear guide ball lubricating grease feed passages reaching the curved passages from the grease nipple and a ball screw ball lubricating grease feed passage reaching the ball screw spiral groove from the grease nipple, whereby simultaneous lubrication for linear guide feed line and ball screw feed line can be achieved.

5 Claims, 3 Drawing Sheets

BALL SCREW INTEGRATED LINEAR GUIDE UNIT

BACKGROUND OF THE INVENTION

The invention relates to ball screw integrated linear guide units preferably used while incorporated into, for example, operating arms of robots and X-Y tables. More particularly, the invention is directed to a ball screw integrated linear guide unit whose maintenance and durability are improved by achieving simultaneous lubrication for both a ball screw feed line and a linear guide feed line.

A conventional grease supplying structure for a single linear guide unit is disclosed, for example, in Japanese Utility Model Examined Publication No. 63-29940. This conventional example includes: an axially extending guide rail having ball rolling grooves on lateral sides thereof; and a slider stretched over the guide rail, the slider being U-shaped and having ball rolling grooves on both inner side surfaces thereof so as to confront the ball rolling grooves of the guide rail. A large number of balls are interposed between the confronting ball rolling grooves of the guide rail and the slider. The slider is axially movable by the rolling of the balls while guided by the guide rail. End caps are mounted on both front and rear end surfaces of the slider, respectively. Each end cap has a circulating passage for effecting endless circulation by causing the balls to return therethrough. The circulation passage includes semicircular recessed spaces formed on each end cap and semi-cylindrical return guides, each having arcuate outer circumference corresponding to the semi-circular curved surface of the recessed space. By attaching the return guide on the semi-circular recessed space orthogonally, the circulation passage becomes semi-doughnut-shaped.

As a result of such a construction, the recessed portion on the flat surface side of each semi-cylindrical return guide is used as a lubricating groove, and a lubricating hole opened from the lubricating groove toward the semi-doughnut-shaped circulation passage is formed by cutting through the side surface of the return guide. On the other hand, a grease feed groove is formed on an end surface of each end cap while communicated with the lubricating grooves of the return guide from a grease nipple mounting hole. The end caps are mounted on the end surfaces of the slider, and then the grease nipple is attached to the slider. Grease supplied from the grease nipple reaches the lubricating grooves of the return guides via the grease feed groove to lubricate the rolling balls.

However, the lubricating structure for the conventional example is designed to lubricate the balls of an independent linear guide unit. Therefore, if this lubricating structure is directly applied to a ball screw integrated linear guide unit in which a linear guide unit and a ball screw unit are integrated with each other, the balls for the linear guide can be lubricated, but the balls for the ball screw cannot be lubricated. Hence, in the case of the ball screw integrated linear guide unit, the ball screw balls cannot be lubricated by the grease supplied from the grease nipple; but the only means for greasing them is by loading grease within the ball screw nut in advance. Thus, the unit has to be disassembled periodically to replenish the lubricant.

The object of the invention is therefore to overcome the above problems by providing a ball screw integrated liner guide unit in which a lubricating structure applicable to lubricating balls in both a linear guide feed line and a ball screw feed line is arranged in a ball screw nut.

SUMMARY OF THE INVENTION

To achieve the above object, the invention is applied to a ball screw integrated linear guide unit which includes: a guide rail with axially extending ball rolling grooves on lateral surfaces thereof; a ball screw shaft being arranged in parallel with the guide rail and having a spiral groove around the outer surface thereof; and a ball screw nut having a spiral groove confronting the spiral groove of the ball screw shaft and being screwed into the ball screw shaft through a large number of balls rolling within both the spiral grooves confronting each other; wherein ball rolling grooves confronting the ball rolling grooves of the guide rail are formed on both lateral surfaces of the ball screw nut; axially extending ball return passages being cut through the nut in parallel with the ball rolling grooves; end caps are fixed on both front and rear end surfaces of the ball screw nut; curved passages for communicating the ball rolling grooves and the ball return passages corresponding to the ball rolling grooves are formed on end surfaces of each end cap; a large number of linear guide balls are rotatably interposed within a circulating passage including both the confronting ball rolling grooves, the curved passages, and the ball return passages; and the ball screw nut is axially movable with respect to the guide rail through circulation of the large number of linear guide balls. In such a ball screw integrated linear guide unit, a lubricating grease supplying mechanism for simultaneously supplying a lubricating grease into the curved passages and the ball screw spiral groove are provided.

The lubricating grease supplying mechanism may be provided in such a manner that a grease nipple is attached to the end cap, and both linear guide ball lubricating grease feed passages reaching the curved passages from the grease nipple and a ball screw ball lubricating grease feed passage reaching the ball screw spiral groove from the grease nipple are provided on an inner end surface of each end cap.

In the invention both the grease feed passages for the linear guide balls extending from the grease nipple to the linear guide curved passages and the grease feed passage for the ball screw balls extending from the grease nipple to the spiral groove of the ball screw nut are arranged on the inner end surface of each end cap. Therefore, the lubricant charged to the grease nipple can be supplied to both lubricating lines, i.e., the linear guide and the ball screw lines, simultaneously.

This feature contributes to significant improvement of the maintenance and durability and permits long operation without disassembling the unit.

DETAILED DESCRIPTION OF THE PREFERRED EMBODIMENT

An embodiment of the invention will now be described with reference to the appended drawings.

Figure 1:
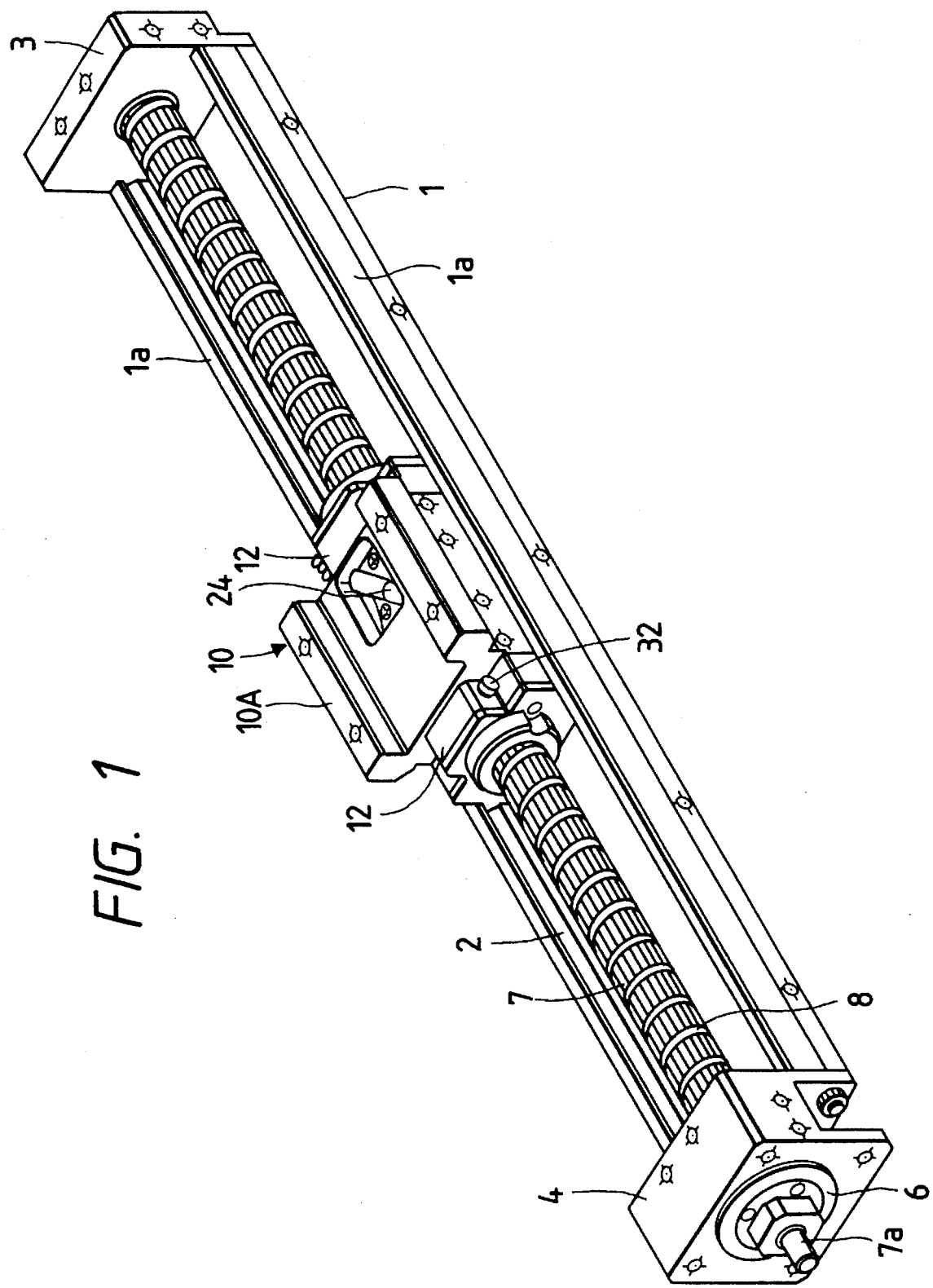
FIG. 1 is a perspective view showing an overall construction of an embodiment of the invention.
Figure 2:
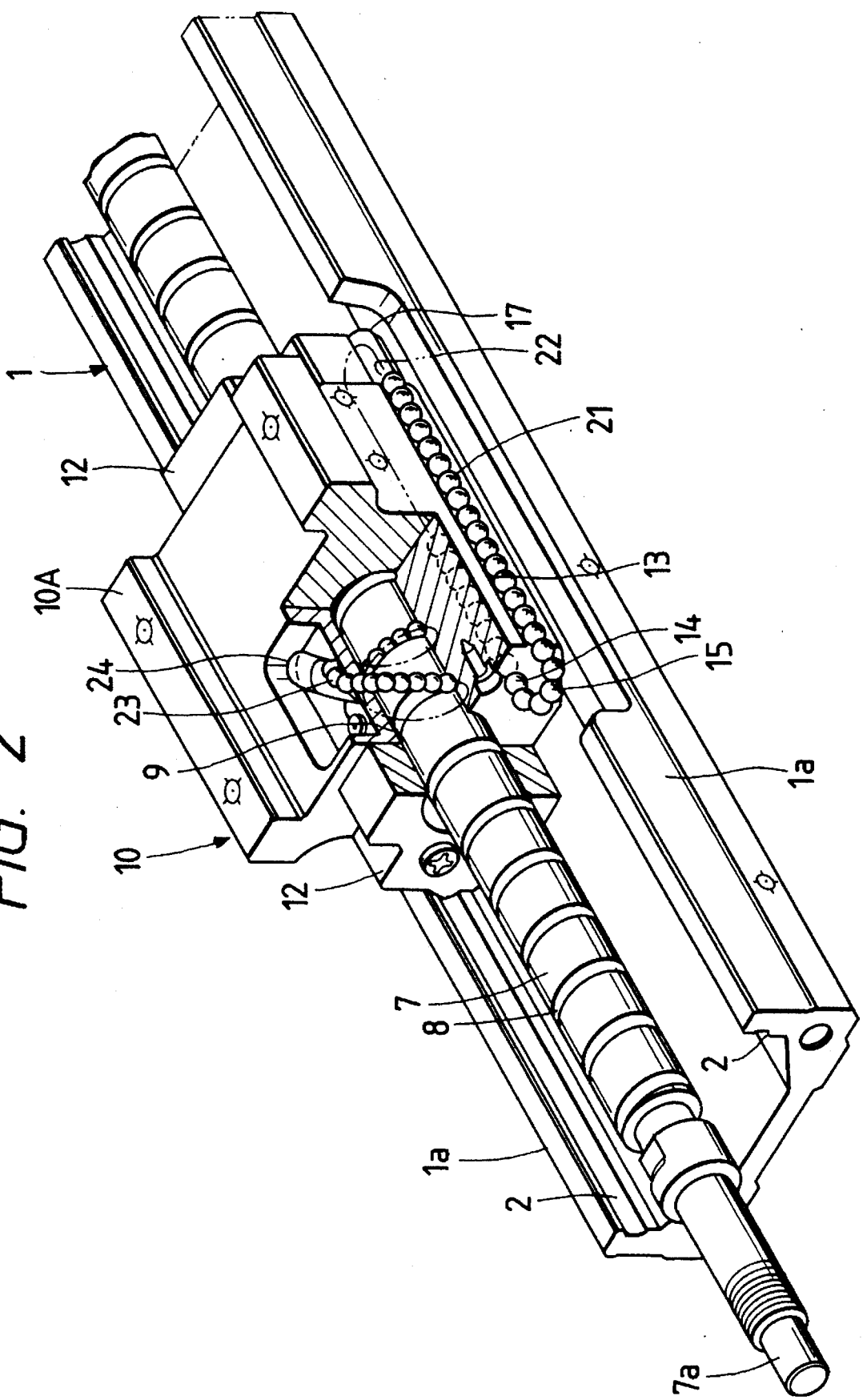
FIG. 2 is a partially cutaway perspective view showing a nut for a ball screw.

As shown in FIGS. 1 and 2, a guide rail 1 of this embodiment is substantially U-shaped in horizontal section and has ball rolling grooves 2 formed on the inner sides of lateral surfaces 1a, 1a rising from a bottom thereof, respectively. These ball rolling grooves 2 extend in an axial direction while confronting each other. Bearing plates 3, 4 are screwed on both axial ends of the guide rail 1. A ball bearing, although not shown, is mounted on the bearing plate 3, whereas not shown angular ball bearings are doubly mounted on the bearing plate 4 through a bearing housing 6 to form a support unit. A ball screw shaft 7 runs in parallel with the ball rolling grooves 2 in the widthwise center of the guide rail 1. A spiral groove 8 is formed around the ball screw shaft 7 as a ball screw groove. One end portion 7a of the ball screw shaft 7 is projected outward from the bearing housing 6 so that the shaft can be coupled with an output shaft of a not shown drive motor.

Figure 3:
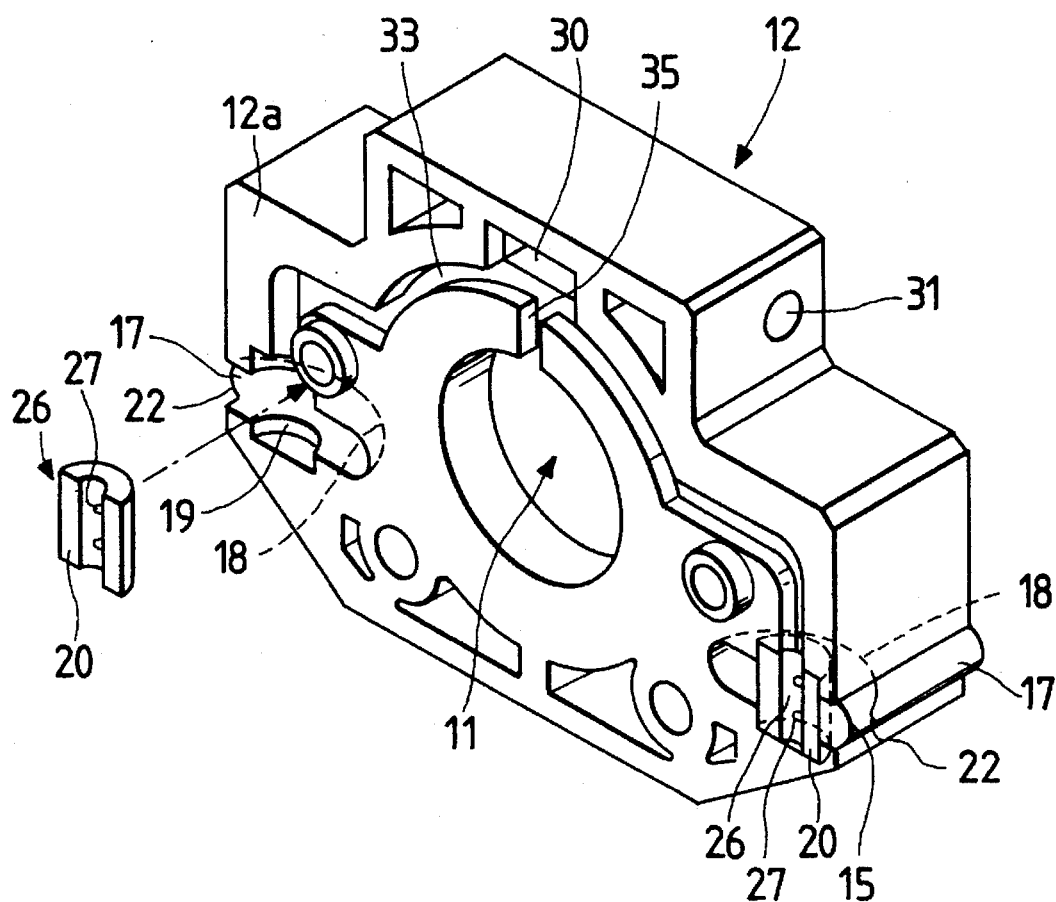
FIG. 3 is a perspective view showing a jointing end of an end cap of FIG. 1.
Figure 4:
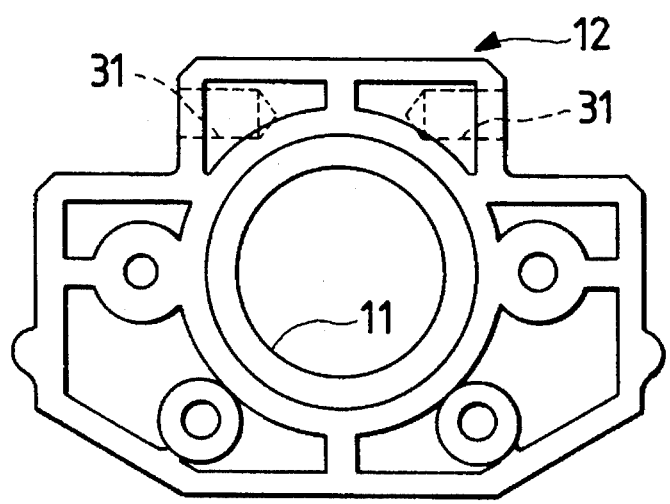
FIG. 4 is a front view showing the opposite end of the end cap of FIG. 1.
Figure 5:
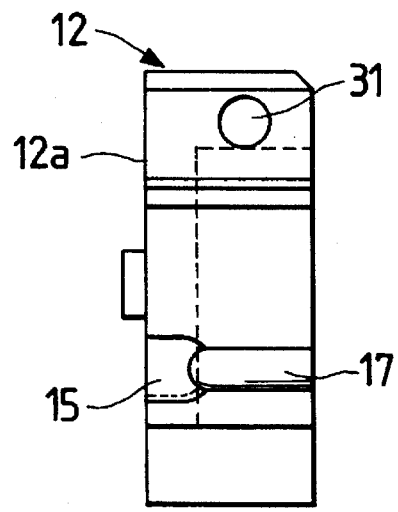
FIG. 5 is a side view of the end cap of FIG. 1.

Reference numeral 10 designates a ball screw nut screwed into the ball screw shaft 7. The ball screw nut 10 has a square nut body 10A and end caps 12 that are secured to both axial ends of the nut body 10A by bolts. Around the inner surface of a screw hole formed in the center of the nut body 10A is a ball screw groove 9, which is also spiral so as to correspond to the ball screw groove 8 on the ball screw shaft 7. The width of the nut body 10A is slightly smaller than that of an inner distance between both lateral surfaces 1a, 1a of the guide rail 1. In the lower opposite lateral surfaces (right and left) of the nut body 10A, ball rolling grooves 13, which confront the ball rolling grooves 2 of the guide rail 1, respectively, are provided. Linear through holes serving as ball return passages 14 are formed by cutting through the nut body 10A in parallel with the ball rolling grooves 13. On the other hand, as shown in FIGS. 3 to 5, a shaft hole 11 for allowing the ball screw shaft 7 to be inserted therethrough is formed in the center of the respective end caps 12. Semi-doughnut-like curved passages 15 for communicating the ball rolling grooves 13 with the ball return passages 14 are formed on the end surfaces 12a to be jointed with the nut body 10A. Referring to the semi-doughnut-like construction of the curved passages 15, laterally projecting portions 17 engageable with the ball rolling grooves 2 of the guide rail 1 are formed on the lateral surfaces of the end caps 12, respectively. A semicircular recess 18 of a large diameter extends from the end surface of each projecting portion 17 to the end surface 12a to be jointed with the nut body 10A of each end cap 12. Further, at the center of the opening of the semicircular recess 18 is a semi-cylindrical recess 19 of a small diameter formed so as to be orthogonal to the opening of the semicircular recess 18. Each semi-doughnut-like curved passage 15 is formed by engaging a semi-cylindrical return guide 20 with the semi-cylindrical recess 19. As described above, an endless ball circulating passage dedicated to the linear guide is formed, the passage including the ball rolling grooves 2 of the guide rail 1, the ball rolling grooves 13 confronting the ball rolling grooves 2, the ball return passages 14, and the curved passages 15 as shown in FIG. 2. A large number of linear guide balls 21 are provided so as to roll inside the endless ball circulating passage. Pickup projections 22 for smoothly guiding the linear guide balls 21 to the curved passages 15 by picking them up from the ball rolling grooves 2 of the guide rail are formed on ends of the curved passages of the projecting portions 17 on the lateral surfaces of each end cap 12.

Further, a U-shaped ball circulating passage 24 is incorporated into the top of the nut-body 10A as a ball screw ball circulating passage for circulating balls 23 of the ball screw which roll within the ball screw groove 8 of the ball screw shaft 7 and within the ball screw groove 9 on the inner surface of the nut confronting the groove 8. The endless circulating system is of a known passage type circulating structure in which the balls 23 are picked up by the ball circulating passage 24 from the ball screw groove 8, obliquely surpasses a land portion of the ball screw shaft 7 along the passage, and returns to the ball screw groove 8.

The construction of a lubricant feeding system of the embodiment will be described with reference to FIG. 3.

An axially extending recessed groove is formed on the flat side of each semi-cylindrical return passage 20. The recessed groove serves as a lubricating groove 26. Lubricating holes 27 that are opened toward the semi-doughnut-like curved passage 15 are formed by passing through the barrel of the return guide 20 from the lubricating groove 26.

On the other hand, a grease reservoir 30 is provided on the top of the end cap 12, and grease nipple attaching holes 31 communicating with the grease reservoir 30 are formed to be open on the lateral surfaces. The grease nipple attaching holes 31 are prepared on opposite lateral surfaces, right and left, as blind holes in advance. When the unit is put in operation, a selected one of the blind holes is made to communicate with the grease reservoir 30 by cutting through the bottom of the blind hole. A grease nipple 32 is thereafter attached to the mounting hole 31.

On an inner end surface (an end surface contacting the nut body 10A) of each end cap 12 are grease feed passages 33 reaching the lubricating grooves 26 of the return guides 20 while bifurcated from the grease reservoir 30 that is located at the top center of the end cap 12. As a result of this construction is a grease feed passage for the linear guide formed for supplying the grease from the grease nipple 32 attached to the grease nipple attaching hole 31 to the curved passages 15 via the grease reservoir 30, the grease feed passages 33, the return guide lubricating grooves 26, and the lubricating holes 27.

Further, on the end surface 12a of the end cap 12 is a feed passage 35 additionally provided as a grease feed passage for the ball screw. This grease feed passage 35 runs from the grease reservoir 30 to the shaft hole 11 at the center. This grease feed passage 35 is short. For adjusting the flow of lubricant in this passage 35 with respect to that in the linear guide grease feed passage that is long, the sectional area of this passage 35 is made smaller than that of the linear guide grease feed passage.

The operation will be described next.

Grease as a lubricant is supplied from the grease nipple 32 attached to the grease nipple attaching hole 31. The grease loaded to the grease reservoir 30 reaches the lubricating grooves 26 of the return guides 20 on both sides via the right and left grease feed passages 33, and supplied to the curved passages 15 past the lubricating holes 27 to thereby lubricate the linear guide balls 21 rolling within the curved passages 15.

At the same time, the grease in the grease reservoir 30 reaches the shaft hole 11 via the grease feed passage 35, so that the grease is supplied to the ball screw groove 8 of the ball screw shaft 7 to thereby lubricate the balls 23 of the ball screw rolling within that groove 8.

As the ball screw shaft 7 is rotated forward (or reversely) by driving a not shown drive motor, the rotation of the shaft is transmitted to the ball screw nut 10 through the balls 23 of the ball screw interposed between the ball screw groove 8 of the ball screw shaft 7 and the ball screw groove 9 of the ball screw nut 10, thereby advancing (or retracting) the ball screw nut 10 in the axial direction in response thereto. The rotation of the ball screw nut 10 is stopped by the linear guide balls 21 interposed between the ball rolling grooves 13 of the nut 10 and the ball rolling grooves 2 of the guide rail 1. The linear guide balls 21 and the ball screw balls 23 circulate through the respective endless circulating passages while rolling and moving in association with the movement of the ball screw nut 10. During the circulation, the linear guide balls 21 are lubricated by supplying the grease in the grease reservoir 30 to the curved passages 15 through the grease feed passages 33.

Similarly, the ball screw balls 23 are lubricated by supplying the grease in the grease reservoir 30 to the ball screw groove 8 of the ball screw shaft 7 through the grease feed passage 35.

The grease can be replenished only by supplying the grease from the grease nipple 32 with a grease gun, contributing to easy handling by the user.

As a result of the above operation, greasing can be effected on both the linear guide and the ball screw lines of the ball screw integrated linear guide unit collectively at once, which contributes to easy maintenance and significant improvement of durability.

While an example of a single-line-per-single-side endless ball circulating passage for the linear guide has been described in the above embodiment, a multi-line structure is also applicable.

As described in the foregoing, the ball screw integrated linear guide unit of the invention is designed to arrange, on the inner end surface of each end cap, the grease feed passages for the linear guide balls which communicate with the curved passages of the linear guide from the grease nipple and the grease feed passage for the ball screw balls which communicates with the spiral groove of the ball screw nut from the grease nipple. Therefore, the grease can be replenished to the two feed lines, i.e., the linear guide and the ball screw feed lines, simultaneously by supplying grease from the grease nipple. As a result, the advantages such as remarkable improvement of maintenance and durability as well as long, stable operation without disassembling the unit can be obtained.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A ball screw integrated linear guide unit comprising:

a guide rail (1) having axially extending ball rolling grooves on lateral surfaces (1a) thereof;

a ball screw shaft (7) arranged in parallel with said guide rail (1) and having a spiral groove (8) around an outer surface thereof;

a ball screw nut (10) having a spiral groove confronting said spiral groove (8) of said ball screw shaft (7) and being screwed into said ball screw shaft (7) through a plurality of balls (23) rolling in a space formed by both the spiral grooves confronting each other, ball rolling grooves (13) confronting the ball rolling grooves of the guide rail (1) are formed on both lateral surfaces of the ball screw nut (10); and axially extending ball return passages (14) are formed through the ball screw nut in parallel with the ball rolling grooves (13);

end caps (12) fixed on both front and rear end surfaces of the ball screw nut (10), curved passages (15) for communicating the ball rolling grooves (13) and the ball return passages (14) corresponding to the ball rolling grooves (13) are formed on end surfaces of each end cap;

a plurality of linear guide balls (21) being rotatably interposed within a circulating passage formed by both the confronting ball rolling grooves (13), the curved passages (15), and the ball return passages (14), in which said ball screw nut (10) is axially movable with respect to the guide rail (1) through circulation of the plurality of linear guide balls (21); and means (32, 33, 35) for simultaneously supplying a lubricating grease into said curved passages (15) and said ball screw spiral grooves (8), in which said lubricating grease supplying means comprises:

a grease nipple (32) attached to at least one of said end caps (12);

linear guide ball lubricating grease feed passages (33) extending to the curved passages (15) from the grease nipple (32); and a ball screw ball lubricating grease feed passage (35) extending to the ball screw spiral groove (8) from the grease nipple (32), wherein said linear guide ball lubricating grease feed passages (33) and said ball screw ball lubricating grease feed passage (35) are provided on an inner end surface of said at least one of said end caps (12).

2. A ball screw integrated linear guide unit according to claim 1, in which said ball screw ball lubricating grease feed passage (35) is shorter than said linear guide ball lubricating grease feed passages (33) in length.

3. A ball screw integrated linear guide unit according to claim 2, in which said ball screw ball lubricating grease feed passage (35) is smaller than said linear guide ball lubricating grease feed passages (33) in a sectional area.

4. A ball screw integrated linear guide unit comprising:

a guide rail having an axial groove;

a ball screw shaft arranged in parallel with the guide rail and having a first spiral groove on an outer surface thereof;

a ball screw not having a second spiral groove for confronting the first spiral groove;

a plurality of linear guide balls rotatably interposed in the axial groove so that the ball screw nut is movable with respect to the guide rail; and an end cap fixed on an axial end surface of the ball screw nut, the end cap having:

a reservoir on a top of the end cap for holding a lubricant;

a curved passage formed on an inner end surface of the end cap for communicating with the axial groove;

a first passage formed on the inner end surface of the end cap for communicating the lubricant from the reservoir to the curved passage; and a second passage formed on the inner end surface of the end cap for communicating the lubricant from the reservoir to the first spiral groove, wherein the second passage is shorter and smaller than the first passage.

5. A ball screw integrated linear guide unit according to claim 4, wherein the end cap includes a nipple for supplying the lubricate to the reservoir.

* * * * *